Dec. 11, 1923.

L. W. CLOSE

ROLLER BEARING

Filed March 18, 1922

1,477,164

Inventor

Lyman W. Close

By

Attorney

Patented Dec. 11, 1923.

1,477,164

UNITED STATES PATENT OFFICE.

LYMAN W. CLOSE, OF TOLEDO, OHIO, ASSIGNOR TO THE BOCK BEARING COMPANY, OF TOLEDO, OHIO, A CORPORATION OF OHIO.

ROLLER BEARING.

Application filed March 18, 1922. Serial No. 544,856.

*To all whom it may concern:*

Be it known that I, LYMAN W. CLOSE, a citizen of the United States, and a resident of Toledo, county of Lucas, State of Ohio, have invented certain new and useful Improvements in Roller Bearings, of which the following is a specification.

This invention relates to anti-friction bearings and more particularly to cages for roller bearings for retaining the rollers in assembled relation with the cone of the bearing.

One of the objects of the invention is to provide a cage of comparatively simple construction which can be manufactured economically from a flat piece of steel and which will possess the requisite characteristics of durability and strength.

A further object of the invention is to provide a cage which will be constructed of a single piece of metal without joints and weak parts.

Other objects of the invention and the features of novelty will be apparent from the following description taken in connection with the accompanying drawings, of which:

Figure 1 is a transverse section of a metal blank from which a cage embodying the invention is formed;

Figs. 2 to 6, inclusive, are transverse sections of the cage in different stages of manufacture;

Figure 11:
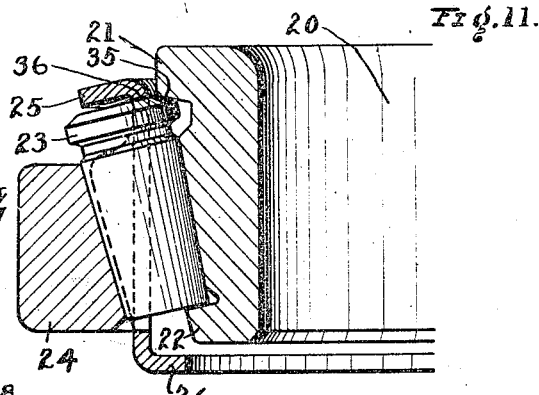
Fig. 11 is an enlarged transverse section of a fragment of a bearing embodying my invention.

Referring to Fig. 11 it will be observed that the cone 20 is provided with the end flanges 21 and 22 which serve to limit the endwise movement of the rollers 23 and co-operate with the cage, which will now be described, to retain the rollers in assembled relation with the cone 20. In Fig. 11 the cup of the bearing is indicated at 24.

The cage comprises the end flanges 25 and 26, one turned outwardly and the other turned inwardly and being connected by bridging members or spacers 27 between the rollers. The bridging members 27 have arranged on their opposite longitudinal edges the wings 28 which partially surround the roller and hold it in the space between the bridging members.

Figure 1:
Figure 2:
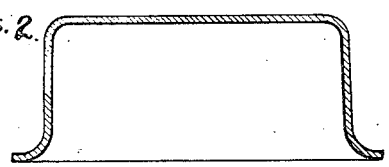
Figure 3:
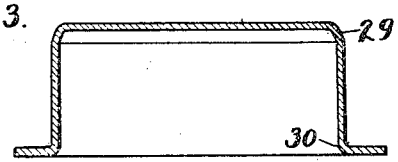
Figure 4:
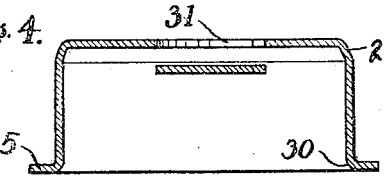

The cage is preferably manufactured from a circular disc of sheet metal such as is indicated in Fig. 1 and the first operation is to press the disc into the shape indicated in Fig. 2. This is what is commonly known as a cupping operation and is formed by means of dies, the construction of which will be readily understood, by those skilled in the art, from an inspection of Fig. 2. The next operation is to re-strike the cup, as shown in Fig. 2, to the form indicated in Fig. 3 in which the corners 29 and 30 are squared up and re-shaped. By the succeeding operation the opening 31 is punched in the bottom of the cup and the flange 25 is trimmed to size.

Figure 5:
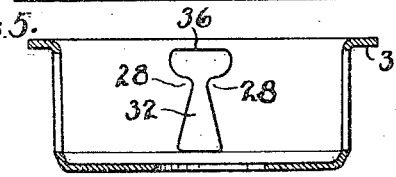
Figure 6:
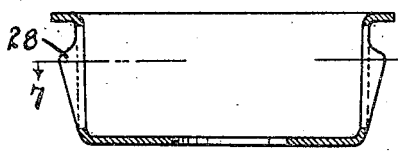
Figure 7:
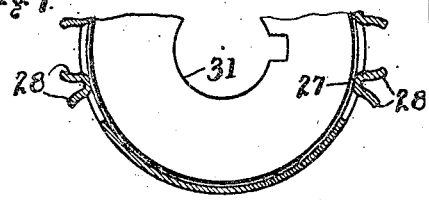
Fig. 7 is a transverse section on the line 7—7 of Fig. 6.
Figure 8:
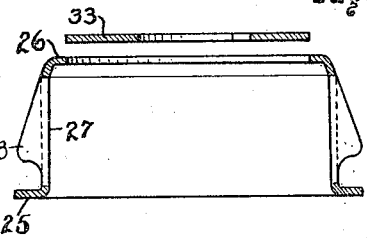
Fig. 8 is a view similar to Fig. 6 but showing the next operation in forming the cage.

The opening 31 is to receive the arbor of an indexing fixture which is employed in the next operation which consists in punching the roller openings 32. In Fig. 5 I have only indicated some of the openings 32 but it will be understood that there will be one such opening formed in the cage for each of the rollers. The next operation is indicated in Figs. 6 and 7 and consists in throwing the wings 28 outwardly and shaping them to conform to the tapered surfaces of the rollers when the latter are assembled in the cage. By the following operation the bottom 33 is punched out, leaving the inturned flange 26.

Figure 9:
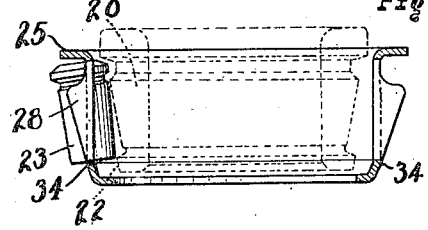
Fig. 9 is a transverse section of the cage indicating the method of assembling the rollers and the cone therewith.

The rollers are then placed in the cage from the interior, the shape of the cage permitting them to assume approximately the position indicated by the roller 23 in Fig. 9. When all the rollers are in their places the cone 20 is inserted, the small ends of the rollers being spaced apart sufficiently to permit the flange 22 on the cone to freely pass, the cone assuming the position indicated in Fig. 10.

The opening for the roller is of a peculiar shape and adjacent the bottom of the cage is narrower than the diameter of the roller at its small end while at the larger end of the roller it is slightly in excess of the diameter. By this construction the roller is held in position in the cage, the larger end being retained by the wings 28.

Figure 10:
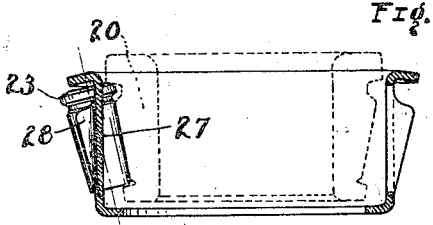
Fig. 10 is a view similar to Fig. 9 but indicating the completion of the assembling operation.

The final operation in assembling consists in pressing the bridging members 27 inwardly at the point 34 adjacent the smaller ends of the rollers, thereby eliminating the bend in the bridging members at this point, as will be seen from Fig. 10. In this operation the flange 25 is also turned down slightly and the smaller ends of the rollers are carried inwardly against the rolling surface of the cone 20 and the latter is thereby locked in its assembled relation with the cage and rollers.

The outer surface of the head of the roller contacts with the inner face 35 of the flange 21 of the cone and, in the final closing operation, the cage will be so held that the end 36 of the roller openings will be in substantial contact with the outer surface of the roller heads. By properly shaping the wings 28 and regulating the final closing operation, which eliminates the bend at the point 34 in the bridging members, the rollers will be closely confined in the cage by the wings 28 and the ends 36 of the roller spaces. This will insure accurate concentricity of the cage with the axis of the bearing and also prevent disalignment of the rollers, thereby providing a construction that will be especially well adapted for heavy loads and relatively high speeds.

By making the cage of a relatively heavy gauge of metal and proportioning the parts as indicated in the drawings a structure of unusual strength is provided. It will be noted that the wings 28 are of substantially triangular form, being widest adjacent the larger end of the roller and tapering to nothing adjacent the smaller end of the roller, this form providing adequate surface for contact with the rollers which minimizes the wear and aids in the lubrication of the bearing when in service.

Having thus described my invention, what I claim is:

1. A cage for roller bearings comprising end flanges and roller spacing bridging members connecting said end flanges and so formed as to leave roller spaces each of which at one end is of less width than the diameter of that part of the roller that fits therein, and at the opposite end is as wide as the diameter of that part of the roller that fits therein, each of said bridging members having wings along its edges adapted to partially surround the rollers to retain the latter in said spaces.

2. A cage for roller bearings comprising end flanges and roller spacing bridging members connecting with the inner edge of one of said end flanges and with the outer edge of the other of said end members and so formed as to leave roller spaces each of which at one end is of less width than the diameter of that part of the roller that fits therein, and at the opposite end is as wide as the diameter of that part of the roller that fits therein, each of said bridging members having wings along its edges adapted to partially surround the rollers to retain the latter in said spaces.

3. In roller bearings the combination of a cone having flanges at its opposite ends and the rolling surface for the rollers therebetween, a series of circumferentially spaced rollers on said surface and a cage for retaining said rollers properly spaced and in assembled relation with said cone comprising end flanges and roller spacing bridging members connecting said end flanges and so formed as to leave roller spaces each of which at one end is of less width than the diameter of that part of the roller that fits therein, and at the opposite end is as wide as the diameter of that part of the roller that fits therein, each of said bridging members having wings along its edges adapted to partially surround the rollers to retain the latter in said spaces.

4. In roller bearings, the combination of an inner race member, a series of circumferentially spaced rollers assembled with said member and a cage for retaining said rollers properly spaced and in assembled relation with said member comprising end flanges and roller-spacing bridging members connecting said end flanges and so formed as to leave roller spaces each of which at one end is of less width than the diameter of that part of the roller that fits therein, each of said bridging members having wings along the edges adapted to partially surround the rollers, and one of said end flanges being in substantial contact with the larger end of the roller and cooperating with said wings to closely confine the rollers in the said spaces and hold the cage in substantially concentric relation to said inner member.

In testimony whereof I affix my signature.

LYMAN W. CLOSE.